United States Patent [19]
Finch et al.

[11] Patent Number: 5,284,199
[45] Date of Patent: * Feb. 8, 1994

[54] PANEL CONSTRUCTION FOR A WALL OR ROLL-UP DOOR SYSTEM

[76] Inventors: Harry E. Finch, 36410 Monte De Oro, Temecula, Calif. 92592; Geza J. Szayer, 24771 Acropolis Dr., Mission Viejo, Calif. 92691

[*] Notice: The portion of the term of this patent subsequent to Dec. 22, 2009 has been disclaimed.

[21] Appl. No.: 992,713

[22] Filed: Dec. 18, 1992

Related U.S. Application Data

[63] Continuation-in-part of Ser. No. 424,944, Oct. 23, 1989, Pat. No. 5,172,744.

[51] Int. Cl.⁵ .............................................. E06B 9/08
[52] U.S. Cl. .................................. 160/133; 403/337; 160/236; 160/235
[58] Field of Search ...................... 160/229.1, 235, 236, 160/133; 52/674, 529, 530; 403/337, 335, 408.1

[56] References Cited

U.S. PATENT DOCUMENTS

| | | | |
|---|---|---|---|
| 443,324 | 12/1890 | Kinnear | 52/529 |
| 2,350,287 | 5/1944 | Michelman | 160/235 X |
| 3,129,793 | 4/1964 | Ferrell | 52/529 X |
| 3,315,429 | 4/1967 | Swanson | 52/529 X |
| 4,570,404 | 2/1986 | Knudson | 52/530 X |
| 4,741,142 | 5/1988 | Otto et al. | 52/529 X |
| 5,172,744 | 12/1992 | Finch et al. | 160/133 |

FOREIGN PATENT DOCUMENTS

| | | | |
|---|---|---|---|
| 209298 | 11/1966 | Sweden | 52/529 |
| 1085462 | 10/1967 | United Kingdom | 52/529 |

*Primary Examiner*—Blair M. Johnson
*Attorney, Agent, or Firm*—Henry M. Bissell

[57] ABSTRACT

A roll-up or curtain type door or panel wall for use in large doorways, the door having an improved support apparatus, an improved spring mounting mechanism, and a unique bearing block which also functions to support the door as it is rolled up. The roll-up door has a substantially stronger hollow hexagonal barrel assembly which is less susceptible to flexural stress, and a spring mounting arrangement which allows the springs to shrink or grow longitudinally as the door is rolled up or down. The barrel assembly is mounted on pivoting support means allowing the barrel assembly to move away from and toward the guide tracks as the door is rolled up and down, whereby the variation in diameter of the barrel assembly does not affect the performance of the door. Interlocking bearing blocks are mounted on the outside side edges of the roll-up door to provide support as the door is rolled onto the barrel assembly and also to provide an edge seal to prevent air from flowing around the edges of the door when it is in its lowered position. A novel seam configuration for releasably joining adjacent panels of the roll-up door is disclosed as part of the invention.

14 Claims, 7 Drawing Sheets

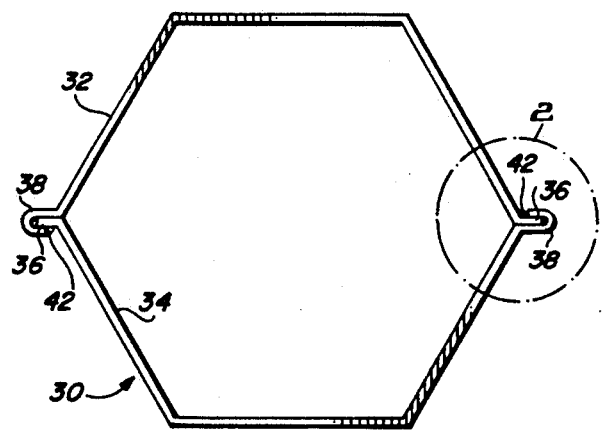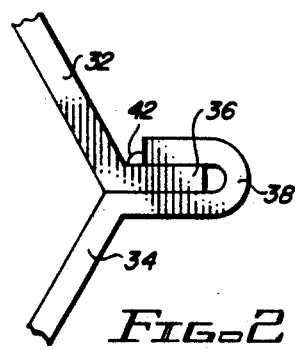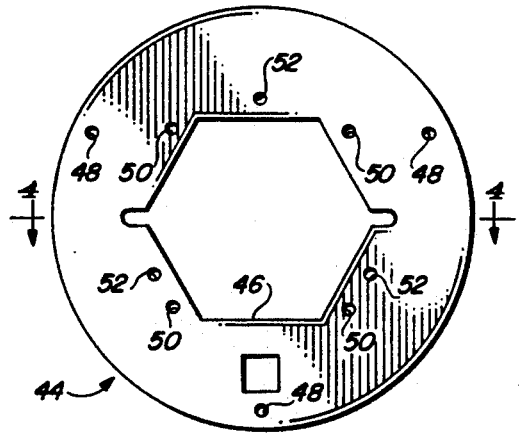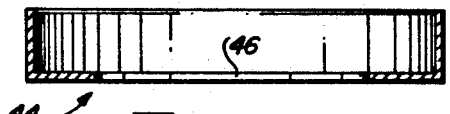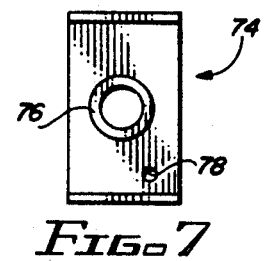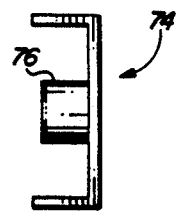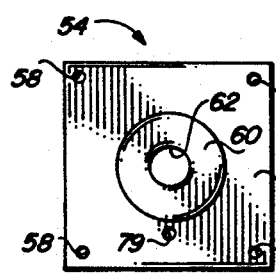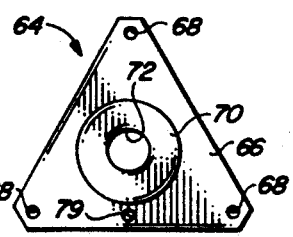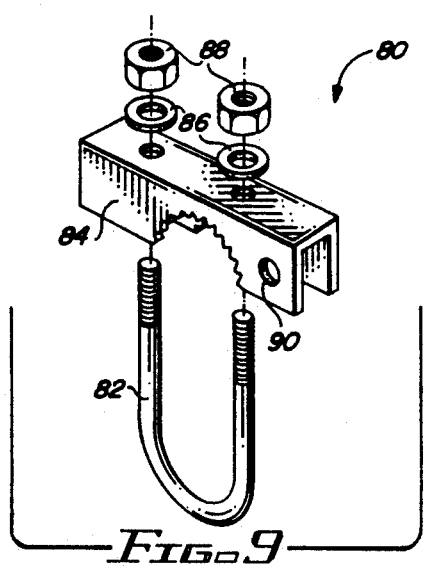

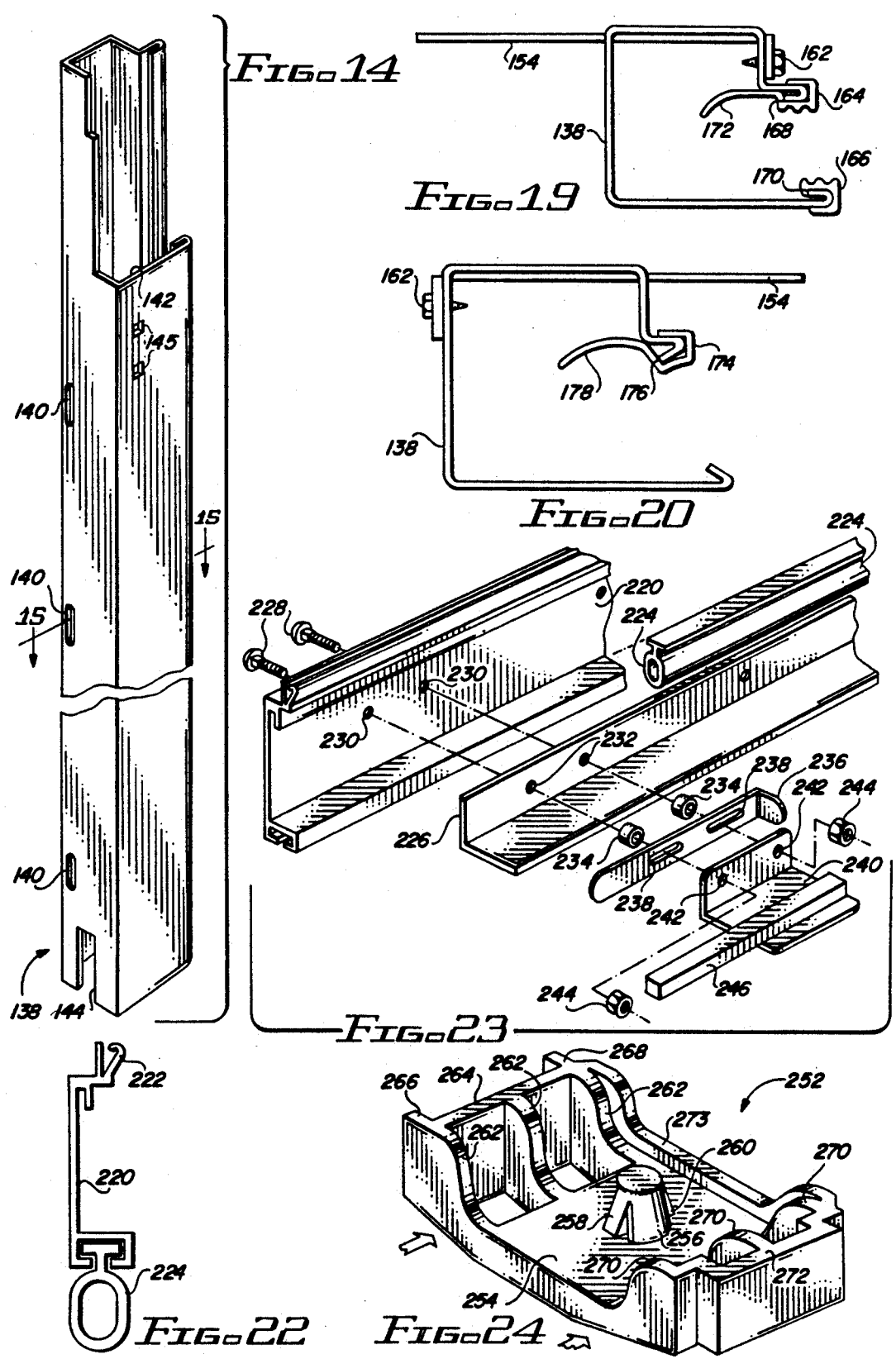

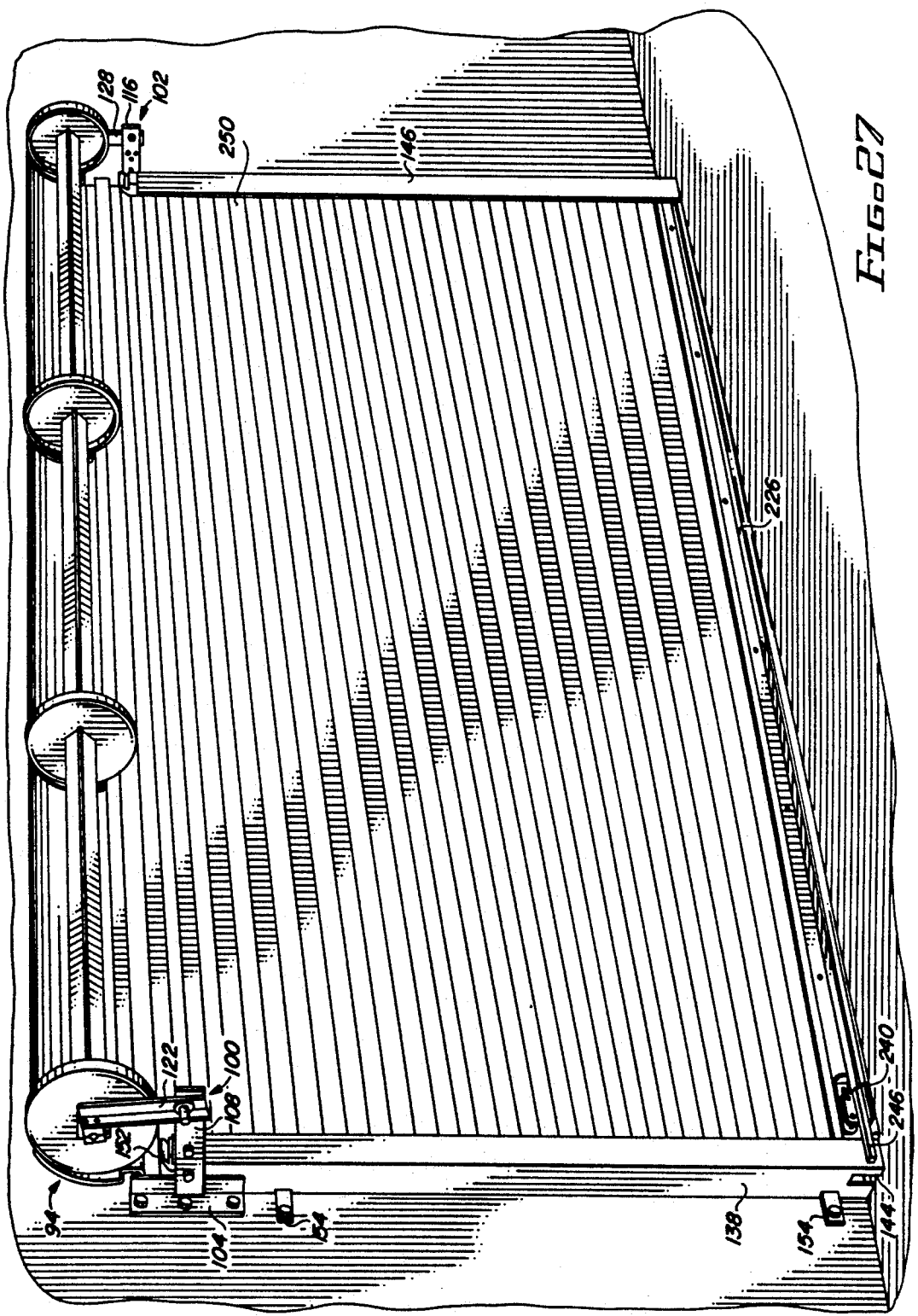

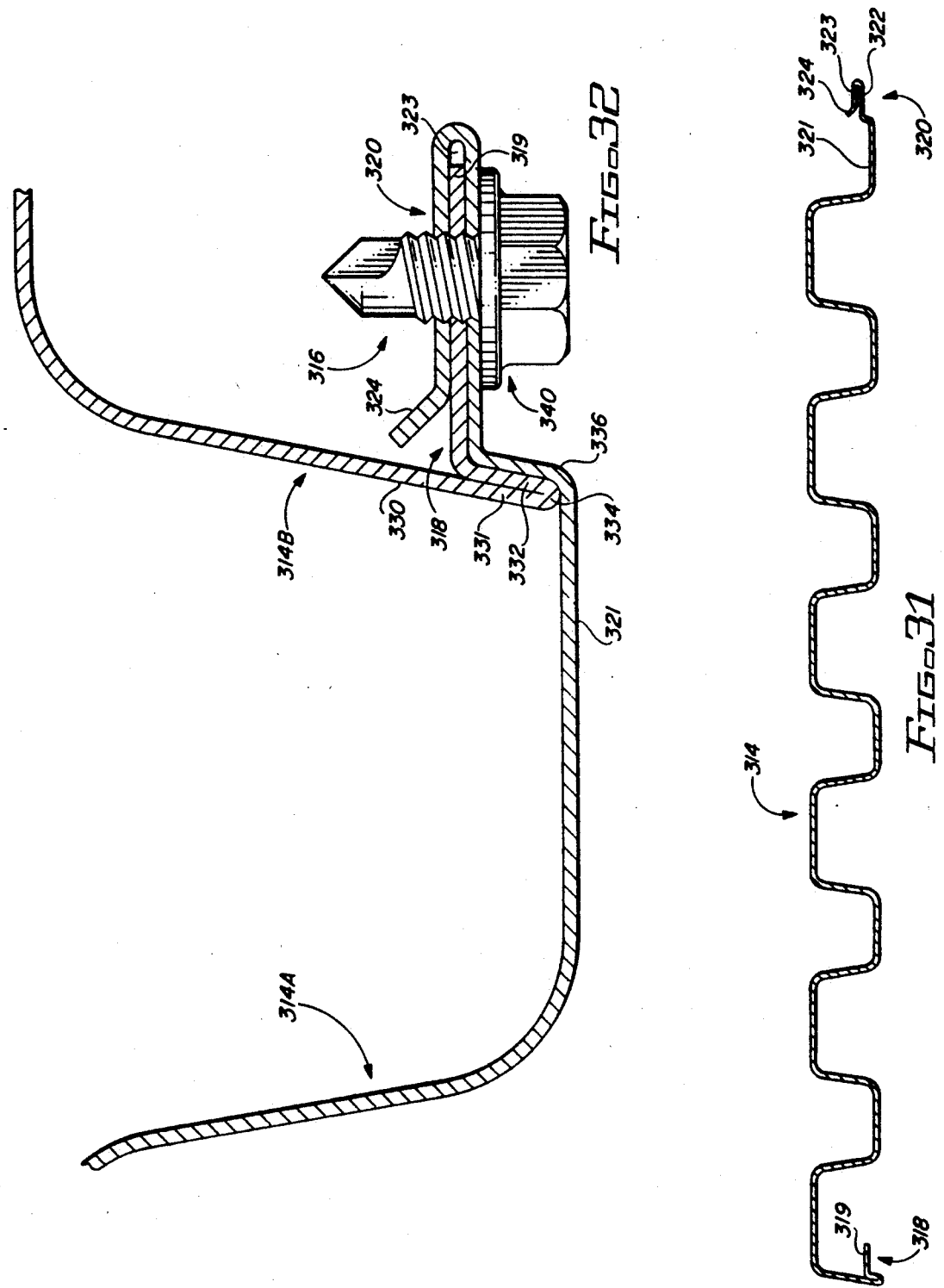

PANEL CONSTRUCTION FOR A WALL OR ROLL-UP DOOR SYSTEM

CROSS-REFERENCE TO RELATED APPLICATION

This application is a continuation-in-part of copending application Ser. No. 07/424,944, filed Oct. 23, 1989, now U.S. Pat. No. 5,172,744, entitled ROLL-UP DOOR SYSTEM.

BACKGROUND OF THE INVENTION

Field of the Invention

The present invention relates generally to a panel construction for a roll-up or curtain type door or other panel assembly and, more particularly, to a construction which facilitates replacement of individual panels and provides a strengthened assembly. The panel is usable in a flexible roll-up door or a planar panel combination.

Description of the Related Art

Buildings ranging in size from mini-warehouses or mini-storage facilities to huge warehouses with entrances sufficiently large to admit large trucks require a secure, lockable door which may be easily opened, and which does not require an inordinate amount of space either for the door itself or for the room required to open and close it. Conventional doors for the most part are not useable in such applications since they are either too small or too unwieldy to be acceptable. Roll-up or curtain doors represent a convenient way to provide an easily operable security closure, and they are able to do so in a fairly limited space.

Roll-up doors are typically constructed using one or more sheets of relatively thin metal which are formed by stamping or rolling to provide a plurality of horizontal corrugations extending the entire width of the door. This construction allows the door to be rolled up as it is raised for opening, thereby allowing the door to be stored in a cylindrical configuration at the top of the door opening. Vertical guide tracks, which may be made of extruded aluminum or formed galvanized steel, are typically mounted at opposite sides of the door opening and serve to guide the door as it moves up and down.

The top of the formed metal sheet is fastened to a barrel assembly which is typically constructed with a heavy wall, steel torque tube axle which supports thereon two or more galvanized steel drums or wheels. The barrel assembly is rotatably mounted between two brackets located slightly above the upper corners of the door opening. The barrel assembly is biased by one or more tempered steel torsion springs to balance the weight of the roll-up door, thereby allowing the door to be easily raised or lowered in a simple one-hand operation. Adhesively affixed tapes typically extend along the inner face of the door where contact is made with the galvanized steel drums or wheels to protect the door against wear by the galvanized steel drums or wheels, and to avoid rubbing of the successive layers of the roll-up door against each other.

Such doors also typically have a locking mechanism mounted thereon, which may be a simple sliding bolt type lock. with this mechanism, when the door is closed the bolt slides into a locking engagement with the guide track or with other metal means which prevents the door from being opened unless the bolt is opened. A simple padlock may then be used to lock the bolt assembly.

This type of roll-up door is easy to operate, and will provide years of dependable service with virtually no maintenance. Such doors are relatively inexpensive and relatively easy to manufacture, although the business of constructing such doors is a highly competitive one. Accordingly it is desirable to provide a high degree of quality and reliability while minimizing the cost of manufacturing the doors. Minimizing the quantity of hardware components is always desirable, both from a cost standpoint and from a desire to minimize the number of parts and by so doing the amount of assembly required.

SUMMARY OF THE INVENTION

In brief, arrangements in accordance with the present invention comprise a corrugated panel suitable for door and wall construction which has a particular edge configuration to facilitate the assembly or disassembly of a panel wall or door to permit the repair or replacement of a section thereof. Particular arrangements in accordance with the present invention incorporate, along a first edge, a narrow U-shaped channel and, along an opposite edge, a straight planar portion joined to the remainder of the panel by a flat-folded, double thickness segment. The panels are conventionally provided in units of any desired width and, in one preferred embodiment, incorporate six corrugated ribs extending from side to side and developing a vertical height of about 16 inches. The double thickness segment is configured to bear against the portion of the opposite edge of the next panel adjacent to the narrow U-shaped channel, thereby strengthening the joint between adjacent panels. As a final assembly step when a pair of panels are being joined together, they are secured in place by a plurality of self-drilling screws extending through the juncture. The screws are located approximately 12 inches on center, preferably.

A further feature of the invention relates to a novel arrangement for joining adjacent panels in the roll-up door in a manner which permits removal and replacement of a damaged panel in the field. The horizontal edges of the door panels are formed with a particular structural configuration, different at each edge, which enables the panels to be joined by sliding them together either vertically or sideways. The panels can be disassembled in reverse fashion. When assembled to form a door, the panels are permitted to flex in their rolled up direction in the same manner as is now provided with conventionally seamed doors.

The panel construction of the present invention is disclosed in the context of a roll-up type door, together with the details of construction of a particular door assembly and support system to which the panel is particularly adapted. It will be understood that the panel is adaptable to use in large planar doors, such as garage doors for example, and in building exterior wall panels and the like.

BRIEF DESCRIPTION OF THE DRAWING

A better understanding of the present invention may be realized from a consideration of the following detailed description, taken in conjunction with the accompanying drawing, in which:

FIG. 1 is an end view of the hexagonal tube used to form the barrel assembly portion of a roll-up door system of our U.S. Pat. No. 5,172,744, the disclosure of which is incorporated herein by reference;

FIG. 2 is an enlarged view of the interlocking edges of the two interlocking segments used to form the hexagonal tube of FIG. 1;

FIG. 3 is an end view of one of the drums which are mounted on the hexagonal tube of FIG. to form the barrel assembly;

FIG. 4 is a cutaway view of the drum shown in FIG. 3;

FIG. 5 is an end view of a square bearing plate for mounting onto a drum at each end of the hexagonal tube;

FIG. 6 is an end view of an alternate triangular bearing plate for mounting onto a drum at each end of the hexagonal tube which may be used instead of the square bearing plate of FIG. 5;

FIG. 7 is an end view of a spring plate to which is attached one end of a spring, the spring plate fitting inside of the hexagonal tube in a manner allowing longitudinal movement inside the hexagonal tube;

FIG. 8 is a side view of the spring plate shown in FIG. 7;

FIG. 9 is a perspective view of a clamp used in the barrel assembly for several purposes, including to hold the other end of a spring to an axle, and to secure lengthwise the rotating portion of the barrel assembly on the axle;

FIG. 14 is a perspective view of the left guide track for supporting the formed metal curtain door, showing the slots in which the reversible clips used for mounting are to be located;

FIG. 19 is a top view of the left track guide of FIG. 14, showing the installation of a reversible mounting clip of FIG. 18, and also showing the installation of plastic track guide members onto the edges of the left track guide, one of the plastic track guide members having a flexible finger seal to prevent air from passing through the door;

FIG. 20 is a top view of the left track guide of FIG. 14, showing the installation of a reversible mounting clip of FIG. 18 in a manner opposite to that shown in FIG. 19, and also showing the installation of an alternate plastic track guide member having a flexible finger seal onto one of the edges of the left track guide;

FIG. 22 is a side view of a reinforcing beam used at the bottom of the formed metal curtain door and a sealing strip mounted at the bottom of the reinforcing beam;

FIG. 23 is an exploded perspective view of the reinforcing beam, the sealing strip, a segment of angle iron, a latch, and a step plate with a head stop bar mounted thereon;

FIG. 24 is a perspective view of one of the bearing blocks used both to cushion one layer of the formed metal curtain door upon another, and, in conjunction with the flexible finger seal, to prevent air from passing through the door;

FIG. 27 is a perspective view of the roll-up door of the present invention with the chain drive of FIG. 21 removed for clarity, with the formed metal curtain door in its fully downward position;

FIG. 31 is an edge view of a corrugated panel for a roll-up door or a wall panel showing an alternative arrangement for joining adjacent corrugated panels; and FIG. 32 is an enlarged view corresponding to the circle A of FIG. 30 but showing the juncture of two adjacent panels of the configuration shown in FIG. 31.

DETAILED DESCRIPTION OF THE PREFERRED EMBODIMENTS

Figure 10:
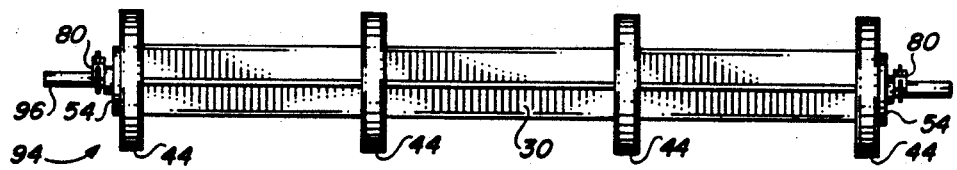
FIG. 10 is a plan view of an exemplary barrel assembly for the roll-up door system disclosed herein, showing four drums mounted on the hexagonal tube, which in turn is rotatably mounted on the axle.

As shown in FIG. 1, a hexagonal tube 30 is illustrated which is made of two identical tube halves 32 and 34. The tube half 32 will be described, it being noted that the construction of the tube half 34 is identical. The tube half 32 has three long, rectangular surfaces, with the longer sides of the three surfaces being connected together at the edges. The angles between adjacent sides is 120°, as is the case with a hexagon. One long free edge of the tube half 32 has a flange 36 extending therefrom, and the other long free edge of the tube half 32 has a U-shaped segment 38 extending therefrom. The flange 36 is oriented directly away from the U-shaped segment 38, and the interior of the U-shaped segment 38 is oriented toward the flange 36.

The tube halves 32 and 34 are brought together to form the hexagonal tube 30, with the flange 36 of the tube half 32 disposed in the U-shaped segment 38 of the tube half 34, and the flange 36 of the tube half 34 disposed in the U-shaped segment 38 of the tube half 32. Note that the free top edge of the U-shaped segment 38 on the tube half 34 is disposed slightly away from the surface of the tube half 32, and that the free top edge of the U-shaped segment 38 on the tube half 32 is disposed slightly away from the surface of the tube half 34. This is because the free legs of the U-shaped segments 38 are shorter than are the attached legs of the U-shaped segment 38.

Referring next to FIGS. 3 and 4, a drum 44 for mounting at various locations along the length of the hexagonal tube 30 is illustrated. The drum 44 is also made of stamped galvanized steel materials, and has a hexagonal aperture 46 therethrough configured to fit exactly over the hexagonal shape of the hexagonal tube 30. The hexagonal aperture 46 also has openings for admitting the U-shaped segments 38 on the hexagonal tube 30. The outer surface of the drum 44 is cylindrical, as best shown in FIG. 4.

The drum 44 has three apertures 48 evenly angularly distributed near the outer diameter of the drum 44, as best shown in FIG. 3. In addition four apertures 50 are distributed around the hexagonal aperture 46 in a square pattern, and three apertures 52 are distributed around the hexagonal aperture 46 in a triangular pattern. In the example used herein, the roll-up door uses four drums 44.

Referring next to FIG. 5, a square bearing plate 54 is illustrated which has a square mounting plate 56 with four apertures 58 in a pattern identical to the pattern of the apertures 50 on the drum 44 of FIG. 3. The square bearing plate 54 has a bearing 60 therein, which bearing 60 has an aperture 62 to admit an axle (not shown in FIG. 5) therein. The axle will thus turn freely in the bearing 60.

Referring next to FIG. 6, an alternative triangular bearing plate 64 is illustrated which has a triangular mounting plate 66 with three apertures 68 in a pattern identical to the pattern of the apertures 52 on the drum 44 of FIG. 3. The triangular bearing plate 64 has a bearing 70 therein, which bearing 70 has an aperture 72 to admit an axle (not shown in FIG. 6) therein. The axle will thus turn freely in the bearing 70.

Referring next to FIGS. 7 and 8, a spring plate 74 is illustrated which is sized to fit within the hexagonal tube 30 (FIG. 1). The spring plate 74 is U-shaped, with the base of the U being wide, as shown in FIG. 8. The height of the spring plate 74 (the width of the U) is just less than the inner height of the hexagonal tube 30 (the distance between opposing rectangular surfaces), and the width of the spring plate 74 (the thickness of the U) is approximately the same as the width of one of the rectangular surfaces of the hexagonal tube 30. Thus, the spring plate 74 will fit within the hexagonal tube 30 and will be able to slide longitudinally within the hexagonal tube 30, but will not be able to move angularly with respect to the axis of the hexagonal tube 30.

Centrally located on the spring plate 74 is a hollow cylindrical segment 76. When the spring plate 74 is installed in the hexagonal tube 30, the cylindrical segment 76 will admit an axially located axle (not shown) therethrough. Also located on the cylindrical segment 76 is an aperture 78, which is located on the base of the U as shown in FIG. 7. The aperture 78 is for use in attaching one end of a spring (not shown) to the spring plate 74, and is located a distance from the axis of the cylindrical segment 76 equal to the radius of the spring (not shown).

Referring next to FIG. 9, a clamp 80 is illustrated, one part of which is a U-shaped bolt segment 82 which is threaded on both ends. A saddle clamp 84 is placed over the two ends of the U-shaped bolt segment 82, and attached with washers 86 and nuts 88. An article located between the saddle clamp 84 and the U-shaped bolt segment 82 will be retained in the clamp 80 as the nuts 88 are tightened. The clamp 80 described to this point is similar to a standard clamp, such as a muffler clamp. However, there is an aperture 90 in the side of the saddle clamp 84, which aperture 90 may be used in attaching the other end of a spring to the clamp 80 (FIG. 11).

Figure 11:
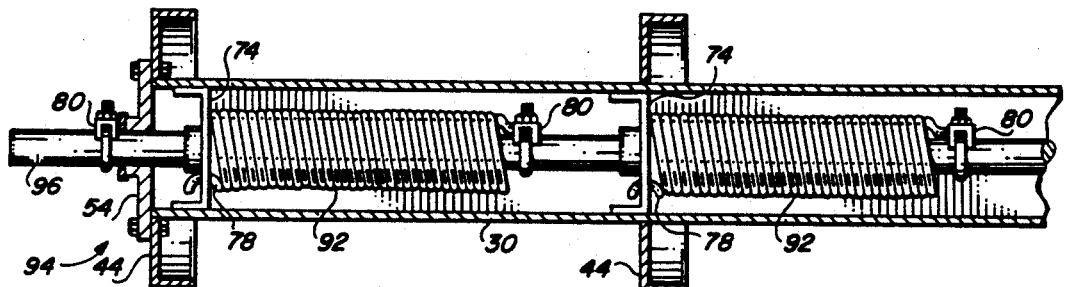
FIG 11 is a cutaway view of half of the barrel assembly of FIG. 10 showing a pair of springs contained therein, one end of each spring being attached to a spring plate, the other end of each spring being attached to the axle.

Referring next to FIGS. 10 and 11, the assembly of the above components and a plurality of springs 92 into a barrel assembly 94 is illustrated. The springs 92 used in the barrel assembly 94 are tempered steel torsion springs, and have at their ends provisions for securing the ends with bolts. The barrel assembly 94 used as an example herein uses four drums 44 and four springs 92, although more or fewer could be used from a single spring to as many as are needed, depending on the size of the door being constructed.

The four drums 44 are located on the hexagonal tube 30 at even intervals, with a drum 44 being located at each end of the hexagonal tube 30 with the flat side facing outward on the hexagonal tube 30. The four drums 44 are welded onto the hexagonal tube 30, typically by spot welding.

It will be appreciated that there are four sets each including a spring 92, a spring plate 74 and a clamp 80, with each of the sets being assembled in the same manner. A spring plate 74 is attached to one end of a spring 92 using a nut, and a saddle clamp 84 is attached to the other end of the spring 92 using a nut. The clamp 80 is assembled loosely, and the assembly is ready for installation in the hexagonal tube 30.

An axle 96 is inserted consecutively through the spring plate 74, the spring 92, and the U-shaped bolt segment 82 of the clamp 80. Three additional spring assemblies are installed on the axle 96 in the same manner, and then the axle 96 together with the four spring assemblies is placed in the hexagonal tube 30. The spring plates 74 will need to be turned to fit properly.

With the axle 96 extending out of both ends of the hexagonal tube 30, two square bearing plates 54 are placed over the ends of the axle 96. (Note that two triangular bearing plates 64 could be used instead of the square bearing plates 54.) The bearing plates 54 are then attached to 44 with four bolts and nuts each.

With the axle 96 extending from both ends of the barrel assembly 94 an equal amount, two clamps 80 are used to retain the hexagonal tube 30 in position intermediate the ends of the axle 96. It will thus be realized that the hexagonal tube 30, the drums 44, the spring plates 74, and the square bearing plates 54 will rotate around the axle 96. As these rotatable components are rotated in one direction (the direction corresponding to the roll-up door being lowered), the springs 92 will be tightened. As these rotatable components are rotated in the other direction (the direction corresponding to the roll-up door being raised), the springs 92 will be loosened.

It will also be appreciated by those skilled in the art that as the springs 92 tighten or loosen, they will be free to lengthen or shorten longitudinally as the spring plates 74 slide longitudinally within the hexagonal tube 30. This will prevent the springs 92 from binding and breaking easily. In addition, it will be seen that the barrel assembly 94 is easy to assemble or disassemble, making replacement of broken springs easily accomplished.

Figure 12:
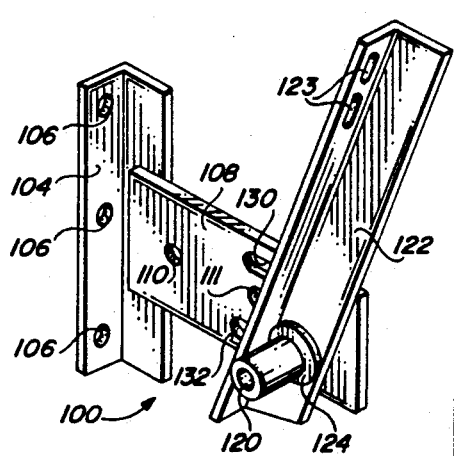
FIG. 12 is a perspective view of one of the left door support brackets, showing it from the side away from the door.
Figure 11A:
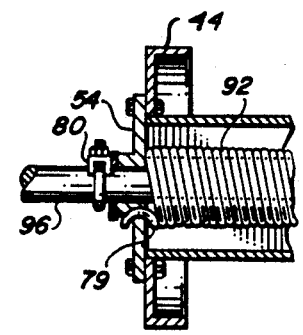
FIG. 11A is a partial view of the barrel assembly of FIG. 10 showing an alternative way of anchoring a spring.
Figure 13:
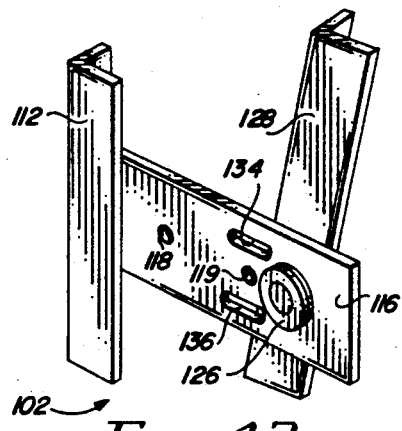
FIG. 13 is a perspective view of the other of the right door support brackets, showing it from the side toward the door.

Referring next to FIGS. 12 and 13, a left door support bracket 100 and a right door support bracket 102 are illustrated. It should be noted that left and right are with respect to the perspective from inside the building in which the roll-up door is installed, gazing toward the door (and toward the outside of the building through the door). The left door support bracket 100 and the right door support bracket 102 are exactly alike, except that they are mirror images of each other.

The left door support bracket 100 has provision for mounting consisting of a segment of angle iron 104 with three apertures 106 therein. The apertures 106 will be used to mount the left door support bracket 100 to the interior wall of the building (not shown) to support the left side of the barrel assembly 94. Welded to and projecting orthogonally from the segment of angle iron 104 is a support plate 108. The support plate 108 has two apertures 110 and 111 therein, which apertures 110 and 111 may be used to support the mechanism for raising and lowering the roll-up door (not shown), if it is mounted on the left door support bracket 100.

Similarly, the right door support bracket 102 has provision for mounting consisting of a segment of angle iron 112 with three apertures 114 (not shown) therein. The apertures 114 will be used to mount the right door support bracket 102 to the interior wall of the building (not shown) to support the right side of the barrel assembly 94. Welded to and projecting orthogonally from the segment of angle iron 112 is a support plate 116. The support plate 116 has two apertures 118 and 119 therein, which apertures 118 and 119 may be used to support the mechanism for raising and lowering the roll-up door (not shown), if it is mounted on the right door support bracket 102.

Projecting from the support plate 108 on the left door support bracket 100 is a left pivot tube 120, which is welded to the support plate 108. A left pivot arm 122 is movably mounted on the left pivot tube 120 using a bushing (not shown) mounted between two washers 124. The left pivot arm 122 extends upwards from the support plate 108, and can move rotatably on the left pivot tube 120. The left pivot arm 122 has two slots 123 located near the top thereof for use in mounting the barrel assembly 94 on the left side thereof.

Similarly, projecting from the support plate 116 on the right door support bracket 102 is a right pivot tube 126, which is welded to the support plate 116. A right pivot arm 128 is movably mounted on the right pivot tube 126 using a bushing (not shown) mounted between two washers (not shown). The right pivot arm 128 extends upwards from the support plate 116, and can move rotatably on the right pivot tube 126. The right pivot arm 128 also has two slots (not shown) located near the top thereof for use in mounting the barrel assembly 94 on the right side thereof.

Located in the support plate 108 are two horizontally extending slots 130 and 132. The slots 130 and 132 are located between the left pivot arm 122 (when it is vertical) and the segment of angle iron 104. The slot 130 is located near the top of the support plate 108, and the slot 132 is located near the bottom of the support plate 108. The slots 130 and 132 will be used in conjunction with hardware mounted therein to limit the rotational movement of the left pivot arm 122 in both directions.

Located in the support plate 116 are two horizontally extending slots 134 and 136. The slots 134 and 136 are located between the right pivot arm 128 (when it is vertical) and the segment of angle iron 112. The slot 134 is located near the top of the support plate 116, and the slot 136 is located near the bottom of the support plate 116. The slots 134 and 136 will be used in conjunction with hardware mounted therein to limit the rotational movement of the right pivot arm 128 in both directions.

Figures 15, 17:
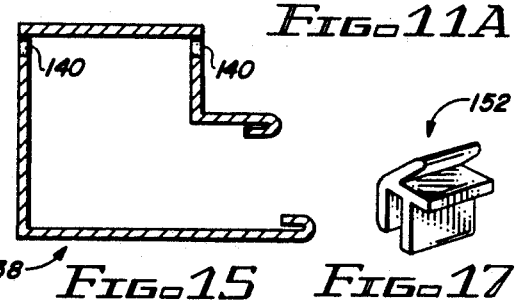
FIG. 15 is a cutaway view of the left rack guide showing the slots in which one of the reversible clips used for mounting is to be located.
FIG. 17 is a perspective view of the plastic glide used at the tops of the track guides to guide the formed metal curtain door into the track guides.

Referring next to FIGS. 14 and 15, a left guide track 138 is illustrated which is formed of galvanized steel sheet stock bent as shown. The left guide track 138 has a plurality of pairs of opposed slots 140 formed therein (one such pair is shown in FIG. 15) for receiving mounting hardware (not shown in FIGS. 14 and 15) to mount the left guide track 138 to the interior wall of a building (not shown) adjacent the left side of an opening therein. The mounting hardware will thus extend through the left guide track 138. The slots 140 are stamped into the left guide track 138 at the time it is manufactured.

The left guide track 138 has both longitudinal edges bent inwardly, with the area between the two longitudinal edges defining the area into which the roll-up door will fit. The side of the left guide track 138 which will face the wall on which the left guide track 138 is mounted is higher than is the other side. The top edge 142 on the lower side of the left guide track 138 is approximately nine inches lower than the edge facing the wall on which the left guide track 138 is mounted.

Below the edge 142 are two square apertures 145 for receiving connectors. On the bottom of the left guide track 138 on the side which will face away from the roll-up door is a notch 144, which will be used to lock the roll-up door in the lowered position. A right guide track 146 (FIG. 27) which is the mirror image of the left guide track 138 will also be used to mount the roll-up door.

Figure 16:
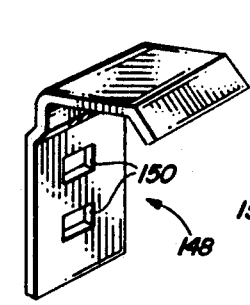
FIG. 16 is a perspective view of the head stop which is located at the top of the track guides to stop further upward movement of the formed metal curtain door when its bottom is at the top of the track guides.

Referring next to FIG. 16, a head stop 148 which will be used to limit the upward movement of the roll-up door is shown. The head stop 148 is J-shaped, with the J being mounted upside-down. Two square apertures 150 are located in the head stop 148, which correspond to the apertures 145 in the left guide track 138. Carriage bolts (not shown) will be used to mount the head stop 148 to the left guide track 138 to limit the upper movement of the roll-up door.

Referring next to FIG. 17, a plastic glide 152 which will be installed on the edge 142 on the left guide track 138 (and on a similar edge on the right guide track 146) is illustrated. The plastic glide 152 is designed to guide the roll-up door from a position above and in front of the edge 142 of the left guide track 138 into the left guide track 138. In the preferred embodiment, the plastic glide 152 is made of a hard, slippery plastic material, which will fit in an interference fit on the edge 142 of the left guide track 138.

Figure 18:
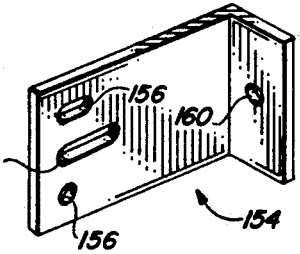
FIG. 18 is a perspective view of a reversible mounting clip for installation in the slots in the track guides to hold the track guides in position on the interior of the wall on which the door is located.

Referring now to FIG. 18, a reversible mounting clip 154 is shown which is L-shaped. Near the top of the L are two apertures 156 and a slot 158, and in the bottom of the reversible mounting clip 154 is a single aperture 160. The length of the reversible mounting clip 154 is sufficient to fit through a pair of the slots 140 in the left guide track 138 (FIG. 14) with a goodly amount protruding, as best shown in FIGS. 19 and 20.

FIG. 19 shows the reversible mounting clip 154 installed in the left guide track 138 in a manner extending away from the opening the roll-up door is to be installed in. Such a mounting arrangement is used where the left guide track 138 is to be mounted onto a building having cinder-block construction, for example, where holes cannot be drilled too close to the opening. A hole is drilled through the aperture 160 into the left guide track 138, and a self-threading bolt 162 is screwed in through the aperture 160 and the drilled hole to retain the reversible mounting clip 154 on the left guide track 138. Bolts or other hardware (not shown) are used in the apertures 156 and/or the slot 158 to secure the reversible mounting clip 154 and the left guide track 138 on the inner wall of the building (not shown) near the opening in which the roll-up door is to be installed.

FIG. 20 illustrates the reversible mounting clip 154 installed in the left guide track 138 in a manner extending toward the opening the roll-up door is to be installed in. This mounting arrangement may be used if the opening in which the roll-up door system is to be installed has a metal frame.

FIG. 19 also shows the installation of plastic door slides 164 and 166 on each of the two longitudinal edges (FIG. 14) of the left guide track 138, with the plastic door slides 164 and 166 functioning to guide the roll-up door when it is raised or lowered. The plastic door slides 164 and 166 have a basically U-shaped cross-sectional configuration to surround the longitudinal edges of the left guide track 138. The plastic door slide 164 fits on the longitudinal edge of the left guide track 138 facing the outside of the opening in which the roll-up door is installed, and the plastic door slide 166 fits on the longitudinal edge of the left guide track 138 facing the inside.

The plastic door slide 164 has a retaining edge 168 which snaps over the folded outer edge of the left guide track 138 to retain the plastic door slide 164 in place. In a similar fashion, the plastic door slide 166 has a retaining edge 170 which snaps over the folded inner edge of the left guide track 138 to retain the plastic door slide 166 in place. The plastic door slides 164 and 166 are both molded of low-friction plastic material.

The construction of the plastic door slide 164 differs from the construction of the plastic door slide 166 in that the plastic door slide 164 has an inwardly extending molded plastic flexible finger 172 attached thereto adjacent the retaining edge 168. The flexible finger 172 extends toward the interior of the left guide track 138, and curves in a direction toward the interior of the building in which the roll-up door is installed at the unattached end thereof. The flexible finger 172 will serve to help seal the roll-up door when it is in its lowered position, to prevent air from passing through the door around the side edges thereof.

As mentioned above, the left guide track 138 is installed on the left side of the opening immediately inside the edge of the opening, and the right guide track 146 (FIG. 27) is installed on the right side of the opening immediately inside the edge of the opening. The right guide track 146 may use the identical plastic door slides 164 and 166, but will have them installed in an inverted position to form mirror images of the plastic door slides 164 and 166 on the left guide track 138.

FIG. 20 illustrates a different arrangement in which a plastic door slide 174 is installed on the folded outer edge of the left guide track 138. The longitudinal edges of the left guide track 138 are not folded flat, but rather at an approximately thirty degree angle. Thus, while the plastic door slide 174 is U-shaped to fit over the outer longitudinal edge of the left guide track 138, it has a retaining curve 176 to retain the plastic door slide 174 in place on the outer edge. The plastic door slide 174 also has an inwardly extending molded plastic flexible finger 178 attached thereto adjacent the retaining curve 176. The inner longitudinal edge does not use a plastic door slide in the embodiment shown in FIG. 20.

Figure 21:
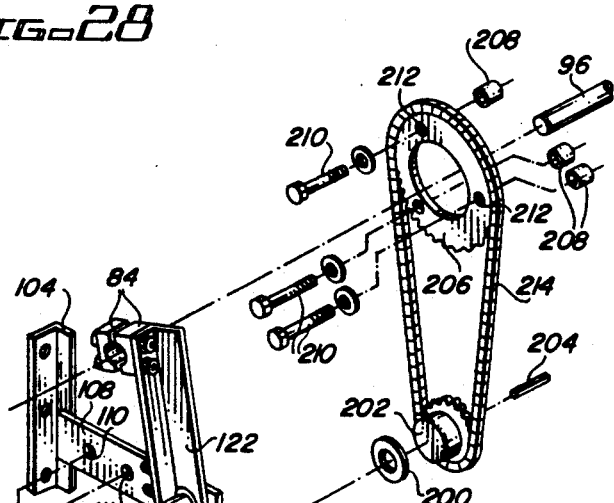
FIG. 21 is an exploded perspective view of a chain drive assembly for raising and lowering the formed metal curtain door of the system disclosed herein.

Referring next to FIG. 21, the mechanism which will be used to raise and lower the roll-up door is illustrated together with the left door support bracket 100, to which it is attached. (The mechanism could alternatively be attached to the right door support bracket 102 in similar fashion to that described below.) A chain guide bracket 180 which is a rectangular segment of metal having ends bent outward at ninety degree angles is used to support the majority of the mechanism.

Two apertures 182 and 184 located in the chain guide bracket 180 near one end thereof are used to mount the chain guide bracket 180 on the left door support bracket 100. Two spacers 186 and 188 are used to support the chain guide bracket 180 away from the left door support bracket 100, with two bolts 190 and 192 used to attach the chain guide bracket 180 to the left door support bracket 100. (Thus the chain guide bracket 180 will be supported in front of the left pivot arm 122.) The bolt 190 extends through the aperture 182 in the chain guide bracket 180, the spacer 186, and the aperture 110 in the support plate 108 of the left door support bracket 100. Similarly, the bolt 192 extends through the aperture 184 in the chain guide bracket 180, the spacer 188, and the aperture 111 in the support plate 108 of the left door support bracket 100.

An aperture 194 is centrally located in the chain guide bracket 180. A chain wheel 196 mounted on a shaft 198 has the shaft 198 extending through the aperture 194 in the chain guide bracket 180, supported by a bearing (not shown). A flat washer 200 is welded onto the shaft 198 on the side of the chain guide bracket 180 opposite the chain wheel 196. A sprocket 202 is mounted on the end of the shaft 198 opposite the chain wheel 196, with a key 204 being used to key the sprocket 202 to the shaft 198.

Referring now to FIGS. 3 and 10 in addition to FIG. 21, a sprocket 206 is mounted onto the drum 44 of the barrel assembly 94 on the left end thereof. Three spacers 208 are used to space apart the sprocket 206 and the surface of the drum 44. Three bolts 210 extend through three apertures 212 in the sprocket 206, the three spacers 208, and the apertures 48 in the drum 44. A chain 214 is connected to allow the sprocket 202 to drive the sprocket 206.

Finally, a hand chain 216 is used to drive the chain wheel 196. The hand chain 216 is maintained in place on the chain wheel 196 by the angled ends of the chain guide bracket 180. A chain clip 218 may be mounted to the interior wall adjacent the left guide track 138. The chain clip 218 is used to retain the hand chain 216 therein to prevent the roll-up door from accidentally coming down once it is raised.

Referring next to FIG. 22, a reinforcing beam 220 is used at the bottom of the roll-up door (not shown) to reinforce the bottom edge thereof. The reinforcing beam 220 shown herein is a molded segment, typically made of aluminum. The reinforcing beam 220 is preferably fastened to the bottom of the roll-up door by using a double re-entrant joint formed by inserting a bent portion on the bottom of the roll-up door (not shown) into a cooperating bent portion 222 on the top of the reinforcing beam 220. A sealing strip 224 is retained in the bottom of the reinforcing beam 220 to provide a water resistant seal between the bottom of the roll-up door and the floor or ground.

Referring now to FIG. 23, a segment of angle iron 226 is shown mounted onto the interior side of the reinforcing beam 220. Two bolts 228 extend through apertures 230 in the reinforcing beam 220 and apertures 232 in the segment of angle iron 226 near the left end thereof. A lock spacer 234 is placed on each of the bolts 228 as they protrude through the segment of angle iron 226, as shown. A slide lock 236 has two slots 238 therein which are slightly larger than the outside diameter of the lock spacers 234. The lock spacers are also slightly thicker than the slide lock 236 is. The slide lock 236 fits in place with the two spacers 234 fitting in the two slots 238 of the slide lock 236.

An angle segment 240 has two apertures 242 therein, through which the two bolts 228 pass. Two nuts 244 fit on the ends of the two bolts 228. Thus it will be appreciated that the slide lock 236 is mounted in a manner allowing it to slide back and forth. The end of the slide lock 236 will fit into the notch 144 in the bottom of the left guide track 138 (FIG. 14) when the roll-up door is down and the slide lock 236 is slid to the left.

Welded onto the angle segment 240 is a head stop bar 246, which extends to the left of the angle segment 240. The head stop bar 246 is designed to cooperate with the head stop 148 (FIG. 16) which is mounted just below the edge 142 of the left guide track 138 (FIG. 14). As such, the head stop bar 246 limits the upper movement of the bottom edge of the roll-up door.

Figure 25:
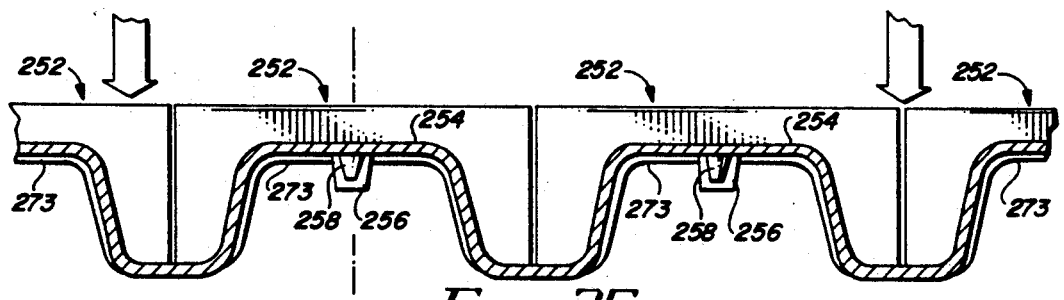
FIG. 25 is an edge view of a portion of the formed metal curtain door with a number of the bearing blocks of FIG. 24 mounted thereon looking in the direction of its arrows in FIG. 24.

The roll-up door which is disclosed herein is a formed metal curtain door 250, which is shown in full in FIG. 27. The formed metal curtain door 250 is of corrugated construction, with a cross-section as shown in FIG. 25. One key aspect of the roll-up door 250 is the use of a plurality of bearing blocks 252 mounted on the side edges of the formed metal curtain door 250 on the outside thereof. One such bearing block 252 is shown in FIG. 24. The bearing block 252 is preferably made of a tough, low-friction plastic material.

The central portion of the bearing block 252 is designed to fit on a corrugation peak (as shown in FIG. 25), and the top and bottom ends of the bearing block 252 are designed to fit in the corrugation valleys on each side of the corrugation peak on which the central portion is located (as shown in FIG. 25). The bearing block 252 is sufficiently wide to fit the entire portion of the formed metal curtain door 250 received in the interior of the left guide track 138 or the right guide track 146.

The central portion of the bearing block 252 thus has a flat surface 254 configured to fit the corrugation peak. Centrally located on the flat surface 254 of the bearing block 252 is a mounting post 256 having two detent tabs 258 and 260 thereon. The mounting post 256 will fit into one of a series of apertures located in each corrugation peak of the formed metal curtain door 250 near the left and right side edges thereof. As mounting post 256 is inserted into such an aperture, the detent tabs 258 and 260 are compressed toward the mounting post 256 until they pass through the aperture in the formed metal curtain door 250. As the detent tabs 258 and 260 pass through the aperture in the formed metal curtain door 250, they spread outwardly again, retaining the mounting post 256 in the aperture and the bearing block 252 in position on the edge on the formed metal curtain door 250.

Located on one side of the flat surface 254 on the bearing block 252 are three ribs 262 which conform to one side of a valley on one side of a peak of the corrugation in the formed metal curtain door 250. On the sides of the ribs 262 not attached to the flat surface 254 is a wall 264, which extends from side to side of the bearing block 252. Two tabs 266 and 268 extend from the sides of the wall 264 on the side away from the ribs 262. The tabs 266 and 268 may be seen as an extension of the outer two ribs 262. The tabs 266 and 268 together with the wall 264 form a U-shaped segment, the interior of which may be seen as a notch.

Located on the other side of the flat surface 254 on the bearing block 252 are three ribs 270 which conform to one side of a valley on the other side of the peak of the corrugation in the formed metal curtain door 250. A U-shaped wall 272 is attached to the sides of the ribs 270 not attached to the flat surface 254 of the bearing block 252. The tops of the legs of the U-shaped wall 272 are attached to the insides of the two outer ribs 270, with the base of the U-shaped wall 272 being attached to the center rib 270. The exterior of the U-shaped wall 272 may be seen as a tongue which is sufficiently narrow to fit into the notch formed by the tabs 266 and 268 and the wall 264.

Figure 26:
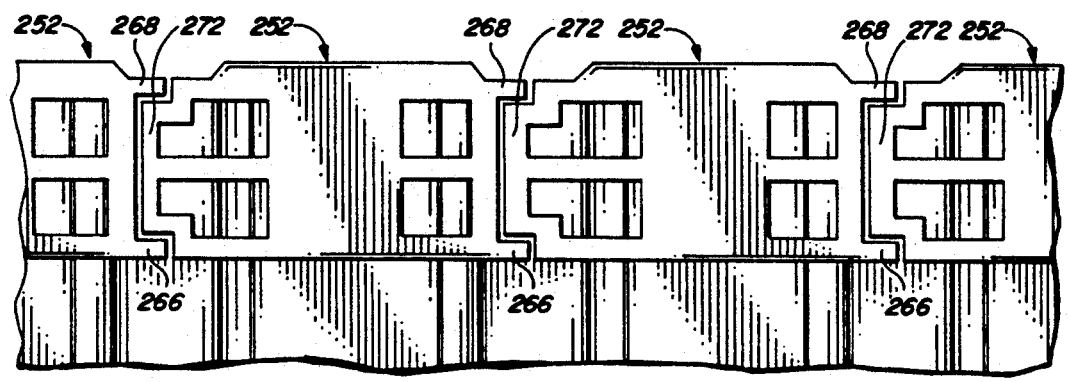
FIG. 26 is a view from the outside of a portion of the formed metal curtain door showing a number of the bearing blocks of FIG. 24 mounted thereon.

One such bearing block 252 thus constructed is mounted onto each peak in the corrugation of the formed metal curtain door 250 on each side thereof. FIGS. 25 and 26 illustrate the installation of several of the bearing blocks 252 onto the outside of the formed metal curtain door 250 on one side edge thereof. It may be seen, particularly in FIG. 26, that the tongue formed by the U-shaped wall 272 of each bearing block 252 fits into the notch formed by the tabs 266 and 268 and the wall 264 of the next adjacent bearing block 252. The bearing blocks 252 will allow the formed metal curtain door 250 to be rolled up, since they are not connected together. The bearing block 252 may also have an edge wall 273, which covers the edge of the formed metal curtain door 250.

The bearing blocks 252 perform two functions. The first function is a supporting function in which the bearing blocks 252 support successive layers of the formed metal curtain door 250 as it is rolled up. The second function is a sealing function, in which the bearing blocks 252 interlock with each other to provide an interlocking fit when the formed metal curtain door 250 is in its lowered position, presenting an essentially flat continuous surface facing the exterior. The flexible finger 172 mounted with the plastic door slide 164 on the outer longitudinal edge of the left guide track 138 (FIG. 19) and a similar flexible finger 172 on the right guide track 146 fit against the continuous groups of bearing blocks 252 on each side of the formed metal curtain door 250. Air is thus essentially prevented from flowing through the roll-up door of the present invention.

Referring now to FIG. 27, the completed assembly of the roll-up door 250 is illustrated, with the mechanism for raising and lowering the formed metal curtain door 250 removed for clarity. The left guide track 138 is mounted on the left side of the opening using the reversible mounting clips 154. Similarly, the right guide track 146 is mounted on the right side of the opening using the reversible mounting clips 154.

The left door support bracket 100 is mounted on the left side and near the top of the left guide track 138. Similarly, the right door support bracket 102 is mounted on the right side and near the top of the right guide track 146. The barrel assembly 94 is supported from the left pivot arm 122 on the left side thereof, and from the right pivot arm 128 on the right side thereof. As shown best in FIG. 28, the axle 96 is clamped to the left pivot arm 122 using a clamp consisting of two facing saddle clamps 84 (FIG. 9) with the axle 96 clamped between them, and two bolts through the two saddle clamps 84 and the two slots 123 is the left pivot arm 122. The right side of the axle 96 is clamped to the right pivot arm 128 in similar fashion.

Figure 28:
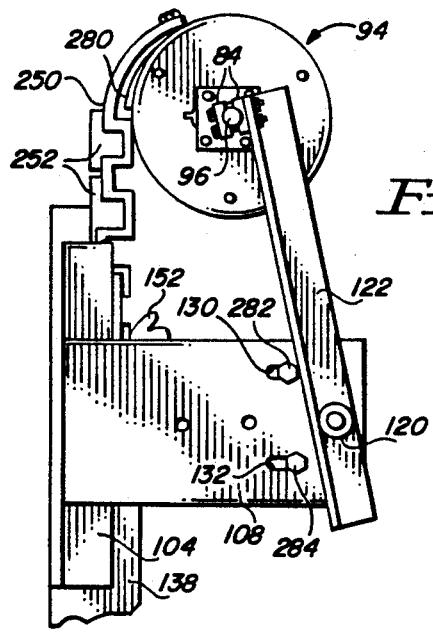
FIG. 28 is a side view of the top portion of the roll-up door of FIG. 27, showing the position of the door support bracket with the formed metal curtain door in its fully downward position.

The top of the formed metal curtain door 250 is attached to the four drums 44 with drum wedges 280 between the top of the formed metal curtain door 250 and the outer diameter of the drums 44, as best shown in FIG. 28. The drum wedges adapt the drums 44 to the first corrugation in the formed metal curtain door 250. The drum wedges 280 may be welded to the drums. The formed metal curtain door 250 is typically bolted to the drums 44.

Referring again to FIG. 28, two retaining studs 282 and 284 are mounted in the slots 130 and 132, respectively. The restraining stud 282 limits the travel of the left pivot arm 122 in a counter-clockwise direction, and the restraining stud 284 limits the travel of the left pivot arm 122 in a clockwise direction. Thus, the restraining stud 282 limits the travel of the barrel assembly 94 at the top of the left pivot arm 122 and the right pivot arm 128 (not shown) toward the outside of the building. Likewise, the restraining stud 284 limits the travel of the barrel assembly 94 at the top of the left pivot arm 122 and the right pivot arm 128 (not shown) toward the inside of the building. Similar retaining studs 282 and 284 are used in the slots 134 and 136, respectively, of the right door support bracket 102, restricting similarly the movement of the right pivot arm 128.

When the formed metal curtain door 250 is in its fully downward position as in FIG. 28, the left pivot arm 122 will be in its fully counter-clockwise direction. (The right pivot arm 128 is also in a similar position.) The barrel assembly 94 is then closest to the point directly above the top of the left guide track 138 and the right guide track 146 (not shown). In this position, the fall of the formed metal curtain door 250 off of the barrel assembly 94 is directly downward into the interior of the left guide track 138 and the right guide track 146 (not shown).

As the formed metal curtain door 250 is rolled up on the barrel assembly 94, the outer diameter will increase. As this occurs, the left pivot arm 122 will move clockwise, carrying together with the right pivot arm 128 the barrel assembly 94 away from the wall on which the roll-up door is mounted. The result of this movement of the barrel assembly 94 on the left pivot arm 122 and the right pivot arm 128 is that the fall of the formed metal curtain door 250 off of the barrel assembly 94 will always be directly downward into the interior of the left guide track 138 and the right guide track 146 (not shown).

Figure 29:
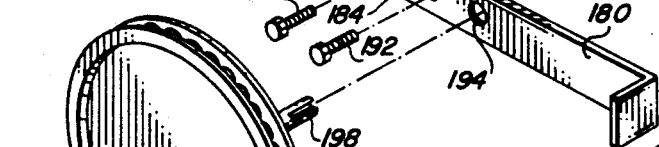
FIG. 29 is a side view of the top portion of the roll-up door of FIG. 27, showing the position of the door support bracket with the formed metal curtain door in its fully raised position.

When the formed metal curtain door 250 is fully rolled up as shown in FIG. 29, the left pivot arm 122 will be in its fully clockwise position, restrained from further movement by the restraining stud 284. (The right pivot arm 128 is also in a similar position.) With the diameter of the formed metal curtain door 250 on the barrel assembly 94 at its greatest, it may be seen that the fall of the formed metal curtain door 250 off of the barrel assembly 94 into the interior of the left guide track 138 and the right guide track 146 (not shown) is still vertical. Thus, it will be appreciated that the entry of the formed metal curtain door 250 into the left guide track 138 and the right guide track 146, as well as its exit therefrom, will be smooth and easy.

Figure 30:
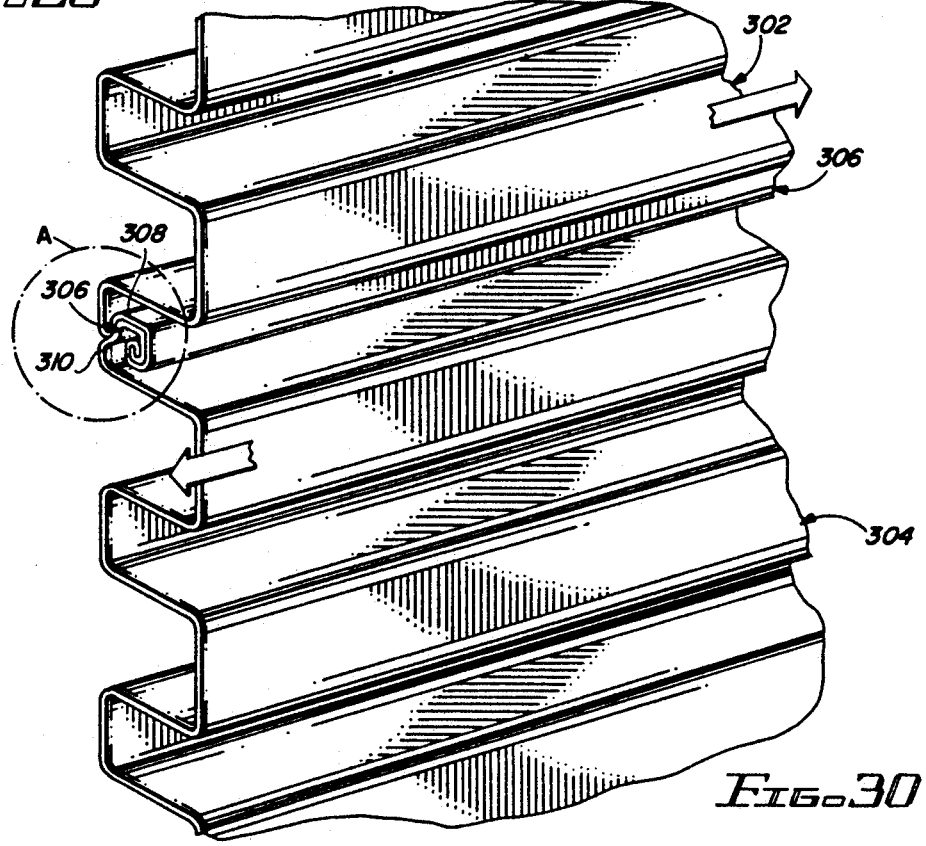
FIG. 30 is a partial view of a roll-up door showing one particular arrangement for joining adjacent corrugated panels.

FIG. 30 illustrates one particular arrangement for joining a pair of panels as part of the corrugated roll-up door. As indicated in FIG. 30, a pair of corrugated panels 302, 304 are joined together by a special seam configuration 306. This seam configuration 306 is constructed for easy assembly and disassembly, so that a damaged panel may be removed and replaced in situ.

The panels 302, 304 are formed with mating edge configurations 308 and 310, as depicted schematically within the circle A in FIG. 30. When two edges 308, 310 of adjacent panels 302, 304 are joined in the seam 306 as indicated in FIG. 30, they can be very readily slid apart sideways, as indicated by the oppositely-directed arrows in FIG. 30. This is only possible, however, if there is sufficient room to the sides of a roll-up door, which is not always the case in the field. To assemble or disassemble an individual panel in this manner, at least double the width of the door is required as space to accommodate the panels as they are slid sideways relative to each other.

This requirement is obviated by the edge configurations of panels in accordance with the present invention. As indicated in FIG. 31, panels 314 in accordance with the present invention are formed with a plurality of transverse corrugations such as 321 extending between opposed edges 318, 320 of the panel which are particularly shaped to matingly engage the edges of adjacent panels. The corrugations are formed with a series of flat-topped ridges and flat-bottomed hollows in conventional fashion. Particular structural details of a juncture 316 between adjacent panels 314A, 314B, are illustrated in the enlarged view of FIG. 32 which also shows details of the structural configuration of the respective mating edges of the two panels.

One panel edge 320 is shaped as a break from the regular shape of the adjacent corrugation 321 comprising a section 322 which extends from the corrugation 321 in a direction generally longitudinal to the panel. The section 322 is folded back on itself in a narrow U-shaped section, the sides of the U being separated by the thickness of the sheet metal to define a space 323 which is just sufficient to receive a planar segment 319 along the edge 318 of an adjacent panel. The edge 320 is shaped to provide an angled lip 324 which serves to guide the planar segment 319 into the space 323.

It will be noted in FIG. 32 that the edge 318 has the termination of its adjacent corrugation 330 folded in a flat double thickness of sheet metal, designated 331, 332. The bottom 334 of the flat-folded, double thickness portion is so located relative to the planar edge segment 319 as to be contiguous with, and closely fitting within, the curve 336 of the corrugation 321. Similarly, the location of the break of the section 332 from the adjacent corrugation 321 corresponds to the spacing of planar edge segment 319 from the bottom 334 of the double thickness portion. By virtue of the mating structural configuration of the two edge portions 318, 320, the sheet metal of the edge configuration 318 is in virtually continuous surface contact with the sheet metal of the edge configuration 320 from the bottom 334 of the flat-folded, double thickness portion all the way to the very edge of the planar segment 319.

Once the mating edges of a pair of adjacent panels are joined together, the joint is self-supporting since the tensional forces developed in operation of the roll-up door system serve to pull the mating edge configurations together in the joint. However, to assure long term stability in use, the mating edges may be locked in place by a plurality of self drilling screws such as 340, preferably of #8 size, located approximately 12 inches on centers. These can be easily removed if it becomes necessary to disassemble the adjacent panels 314 which are joined together in the manner described.

The particular configurations of the respective edge portions of a panel 314 and the joining of the mating edge portions of adjacent panels as shown in FIG. 32 serve to transmit the vertical load resulting from the weight of the panels from one panel to the next as the roll-up door is raised to the uppermost position without there being any slippage or slack between the panels. The shape of the end portions at the juncture of two adjacent panels closely approximates the corrugations between the edges of the panels so that there is no distortion of the roll-up door as it is raised and lowered in use. With this structural configuration of the mating panel edge portions in accordance with the present invention, it is possible to assemble and disassemble panels either by moving them vertically relative to each other in and out of their mating position or by moving them laterally, relative to each other, with the respective mating edge portions sliding along each other (assuming the self-drilling screws 340 are not in place). This makes for a very versatile arrangement of panels assembled to form a roll-up door or some similar panel wall or door construction. Repair of a damaged panel is easily accomplished by virtue of the mating configuration of opposite panel edge portions which can be so readily assembled and disassembled.

Although there have been described hereinabove various specific arrangements of a panel construction for a wall or roll-up door system in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A replaceable panel for use in a roll-up door system or the like comprising:
   a generally square-cornered sheet of formed material bounded by opposite side edges and opposed first and second edges extending between said side edges, said sheet having a plurality of transverse, regularly spaced corrugations extending between said side edges;
   said first and second edges being formed with mating configurations such that the first edge of one panel may be slid into engagement with the second edge of an adjacent panel in a direction generally parallel to said side edges so that a pair of adjacent panels may be joined together;
   said first edge configuration including a generally planar edge segment joined to said sheet by a flat-folded, double thickness portion adjacent said first edge; and
   said second edge configuration including a narrow U-shaped section in which the sides of the U are separated by the thickness of the sheet material for receiving said generally planar edge segment of said first edge configuration in mating engagement therein.

2. The panel of claim 1 wherein the mating configurations of the first and second edges correspond in shape and location so as to provide a self-supporting juncture between adjacent panels.

3. The panel of claim 2 wherein the second edge configuration further includes an angled lip extending outwardly from the termination of the U-shaped section which is adapted to guide the planar edge segment of an adjacent panel into the space between the sides of the U.

4. The panel of claim 1 wherein the transverse corrugations each include a flat-topped ridge and a flat-bottomed hollow and wherein the flat-folded, double thickness portion defines a bottom which is spaced from the generally planar edge segment by an amount which is equal to the displacement of the U-shaped section from the flat-bottomed hollow of the adjacent corrugation in order to establish load bearing contact between the mating edge configurations of adjacent panels when joined together by urging the bottom and side of the flat-folded, double thickness portion into contact with the U-shaped section and adjacent corrugation of the other panel.

5. A pair of replaceable panels for use in a roll-up door system or the like, each panel comprising:
   a generally square-cornered sheet of formed material bounded by opposite side edges and opposed first and second edges extending between said side edges, said sheet having a plurality of transverse, regularly spaced corrugations extending between said side edges;
   said first and second edges being formed with mating configurations such that the first edge of one panel may be slid into engagement with the second edge of an adjacent panel in a direction generally parallel to said side edges so that a pair of adjacent panels may be joined together;
   said first edge configuration including a generally planar edge segment joined to said sheet by a flat-folded, double thickness portion adjacent said first edge; and
   said second edge configuration including a narrow U-shaped section in which the sides of the U are separated by the thickness of the sheet material for receiving said generally planar edge segment of said first edge configuration in mating engagement therein;
   the panels being joined together with mating respective first and second edge configurations wherein the shapes of the respective first and second edge configurations are such that the joined edge configurations are in substantially continuous surface contact from the bottom of the flat-folded, double thickness portion to the terminal edge of the planar edge segment.

6. The combination of claim 5 further including means for releasably securing together said joined edge configurations of said pair of adjacent panels.

7. The combination of claim 6 wherein said releasably securing means comprise a plurality of self-drilling screws penetrating through the sides of the U-shaped section of a joined edged configuration pair and the planar edge segment received therein.

8. A roll-up door system for mounting across a door opening, comprising:
   a pair of guide tracks for vertical installation as door guide members on both sides of the door opening;
   a hexagonal tube member, said hexagonal tube member being hollow;
   a plurality of drums mounted on said hexagonal tube member, one of said drums being mounted at each end of said hexagonal tube member, each of said drums having means defining a generally hexagonal central opening for receiving the hexagonal tube member therein;
   an axle extending through the interior of said hexagonal tube member;
   bearing means for mounting said hexagonal tube member for rotational movement on said axle;
   means for supporting said axle in a horizontal position adjacent the upper edge of the door opening; and
   a roll-up door mounted at the top thereof to and supported by said plurality of drums, said roll-up door being positionable to cover the door opening with the side edges of said roll-up door being retained by said guide tracks, said roll-up door being rolled about said plurality of drums as said roll-up door is raised;
   said roll-up door comprising:
   a plurality of panels joined edge-to-edge to form the roll-up door, each panel being in the form of a generally square-cornered sheet of formed material bounded by opposite side edges and opposed first and second edges extending between said side edges, said sheet having a plurality of transverse, regularly spaced corrugations extending between said side edges;
   said first and second edges being formed with mating configurations such that the first edge of one panel may be slid into engagement with the second edge of an adjacent panel in a direction generally parallel to said side edges so that a pair of adjacent panels may be joined together;
   said first edge configuration including a generally planar edge segment joined to said sheet by a flat-folded, double thickness portion adjacent said first edge; and
   said second edge configuration including a narrow U-shaped section in which the sides of the U are separated by the thickness of the sheet material for receiving said generally planar edge segment of said first edge configuration in mating engagement therein.

9. The system of claim 8 wherein the mating configurations of the first and second edges of each of said panels correspond in shape and location so as to provide a self-supporting juncture between adjacent panels.

10. The system of claim 9 wherein the second edge configuration of each panel further includes an angled lip extending outwardly from the termination of the U-shaped section which is adapted to guide the planar edge segment of an adjacent panel into the space between the sides of the U.

11. The system of claim 8 wherein the transverse corrugations of each panel include a flat-topped ridge and a flat-bottomed hollow and wherein the flat-folded, double thickness of each panel defines a bottom which is spaced from the generally planar edge segment by an amount which is equal to the displacement of the U-shaped section from the flat-bottomed hollow of the adjacent corrugation in order to establish load bearing contact between the mating edge configurations of adjacent panels when joined together by urging the bottom and side of the flat-folded, double thickness portion into contact with the U-shaped section and adjacent corrugation of the other panel.

12. The system of claim 8 wherein the plurality of panels are joined together with mating respective first and second edge configurations and wherein the shapes of the respective first and second edge configurations are such that the joined edge configurations are in substantially continuous surface contact from the bottom of the flat-folded, double thickness portion to the terminal edge of the planar edge segment.

13. The system of claim 12 further including means for releasably securing together the joined edge configurations of adjacent panels.

14. The system of claim 13 wherein said releasably securing means comprise a plurality of self-drilling screws penetrating through the sides of the U-shaped section of a joined edged configuration pair and the planar edge segment received therein.

* * * * *